July 11, 1967     N. E. WISDOM, JR., ETAL     3,331,062

VARIABLE CAPACITANCE ELECTROCHEMICAL MEMORY ELEMENTS

Filed Feb. 18, 1964

NORVELL E. WISDOM, JR.
ERIC O. FORSTER    INVENTORS

BY *Frank A. Simon*

PATENT ATTORNEY

United States Patent Office 3,331,062
Patented July 11, 1967

3,331,062
VARIABLE CAPACITANCE ELECTROCHEMICAL MEMORY ELEMENTS
Norvell E. Wisdom, Jr., Elizabeth, and Eric O. Forster, Scotch Plains, N.J., assignors to Esso Research and Engineering Company, a corporation of Delaware
Filed Feb. 18, 1964, Ser. No. 345,720
14 Claims. (Cl. 340—173)

This invention relates to a novel method and apparatus for storing information. More particularly this invention relates to a novel memory cell which stores information in the form of electric impulses.

It is an object of this invention to provide a novel class of electrochemical components and associated electrochemical devices.

A further object of this invention is to provide a novel class of devices which are useful as memory elements, signal amplitude discriminators, current control elements and other electric circuit components.

It has now been discovered that an electrolytic type cell, composed of metal electrodes immersed in a solution of an electron acceptor and an electron donor-type solvent, can be employed to store information from electric pulses by means of changes in its capacitance. Upon application of a short duration DC pulse to the above described cell, the capacitive behavior is drastically changed to a higher value which may persist for many hours. Thus, the cell may function as a memory cell which stores desired information in the form of changes in capacitance. By applying a pulse of opposite polarity to the cell of this invention, the increase in capacitance may be erased and the total capacitance of the cell may be returned to its initial value. It thus becomes readily apparent that the application of a series of DC pulses of the same polarity would shift the capacitance of the cell in increments dependent on the number, intensity and duration of the pulses. In this manner the cell unit can function as an addition device or, by the same token, as an integrator. Since the application of pulses of opposite polarity is also possible it becomes apparent that the memory cell unit is capable of subtraction and differentation. Thus, the novel cell of this invention may be employed for a variety of purposes as a mathematical operator having extremely facile read out since its final capacitance will be a function of the various operations carried out in the form of electric pulses. Furthermore, the novel cell of this invention may be employed as part of a battery of units in which various pieces of information can be stored for computing purposes or any other application where retention of information for a period of time is necessary.

The invention may be embodied in the forms illustrated in the accompanying drawings which are illustrative of the novel method and apparatus claimed herein.

Figure 1:
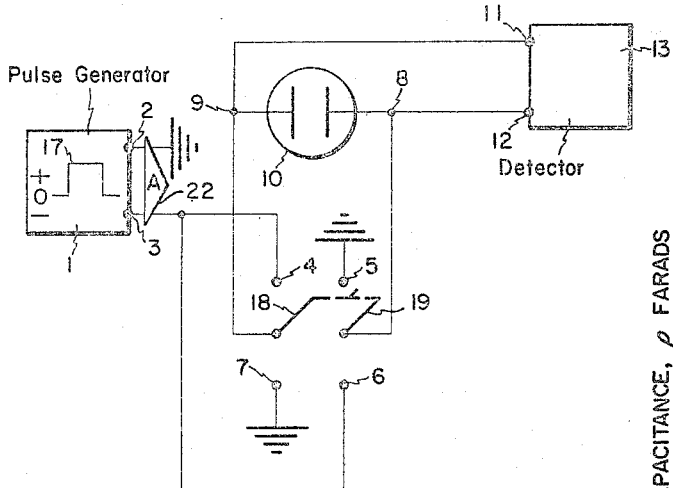
FIGURE 1 represents a schematic circuit diagram of one embodiment of this invention.

Referring more particularly to FIGURE 1, a pulse generator 1 produces either automatically or in response to manual operation a pulse 17 of positive voltage which may be amplified by amplifying means 22, across the output terminals 2 and 3. Coupled to the output terminals 2 and 3 is a double pole double throw switch having stator contacts 4, 5, 6 and 7 respectively. Specifically, the terminal 3 of the pulse generator is connected to switch terminals 4 and 6. Switch terminals 5 and 7 are either grounded or otherwise connected to terminal 2 of the pulse generator. It is to be understood that the double pole double throw switch shown in FIGURE 1 is merely illustrative of one method of operation and any apparatus for controllable connection of the pulse generator so as to supply either a positive or negative pulse to the cell 10 may be substituted.

Connected to the switch arms 18 and 19 of the double pole double throw switch is an electrochemical cell 10 having terminals 8 and 9. A suitable capacitance measuring device 13 is connected across terminals 8 and 9 of the cell component 10 via terminals 11 and 12 of the measuring device. It is to be understood that a wide variety of capacitance measuring devices and methods are suitable for use in this invention provided only that such systems are arranged so as to yield negligible net current across the cell when the particular system employed utilizes current pulses for measurement. It will be further understood from the description below that an explicit measurement of capacitance need not be made for all applications of the system of this invention, but the capacity may be determined implicitly as either being or not being significantly different from some specified value. Such a value may be specified by tuning the circuit of FIGURE 1 for the passage of alternating current of a certain frequency.

Figure 2:
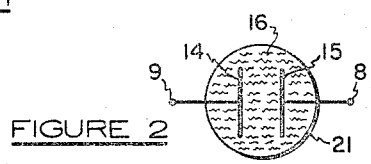
FIGURE 2 is an illustration of the electrochemical cell component of this invention.

FIGURE 2 illustrates one embodiment of the electrochemical cell component of this invention. The cell consists of a container 21 which contains a solution 16 of an electron acceptor and a heterocyclic type solvent. Immersed in the solution 16 is a pair of electrodes 14 and 15 which are provided with external electrical terminals 8 and 9 thereby adapting the cell for utilization in a circuit such as shown in FIGURE 1. The entire cell component may be sealed into the container 21 leaving only the external terminals 8 and 9 and the outer wall of the container exposed to ambient conditions and such a sealed construction is preferred in most applications.

The electrodes 14 and 15 employed in the cell of this invention may be fabricated from a wide variety of metals such as the noble metals, transition metals and iron group metals. Particularly preferred are the platinum group metals. While the electrodes of FIGURE 2 are illustrated as parallel plates a wide variety of arrangements may be employed without departing from the scope of this invention. Other arrangements such as concentric cylinders or one cylinder and one plate may be advantageously employed in some instances. While the area and spacing of the electrodes will have an effect on the quantitative value of the capacitance this value will not effect the over-all operation of the system since the actual capacity readings may be calibrated to represent any desired value.

The container 21 may be fabricated of any nonconducting material which is not subject to chemical attack by the solution 16. Suitable materials are glass, nonporous ceramics and plastics such as Teflon and polyolefins.

As previously mentioned in this specification, the liquid solution 16 employed in the cell of this invention is a mixture of an electron acceptor and electron donor type solvent. Suitable electron acceptors are perhaloquinones, such as bromanil and chloronil; percyanoquinones and tetracyanoethylene. The preferred electron acceptors are halogens with iodine being most preferred. The electron donor solvent may be selected from the group consisting of heterocyclic amines such as pyridine, pyrrole, quinoline and pyrimidine; saturated amines such as piperidine, ethylenediamine, triethylamine; and aromatic solvents such as benzene, toluene, xylene, and methenaphthalene. Particularly preferred solvents are pyridine and its derivatives.

The concentration of the electron acceptor in the electron donor solvent may vary over wide limits. Suitable concentrations are in the range of 0.1 to 10 wt. percent, preferably 0.1 to 1 wt. percent. The primary effect of the concentration is on the range of capacitance and the resistance of the cell. Although actual capacitance is not significant, since the measuring devices may be calibrated in any suitable manner, the saturation capacity, i.e., the point at which no further pulses will affect a change in capacitance, does represent a limitation on the cell, and a very low or very high resistance as obtained at very high and very low concentrations of electron acceptor components might be inconvenient in some applications.

The intensity, or amplitude, and duration of the voltage pulses are critical features of this invention. While no sufficient theoretical explanation is available, it has been discovered that the pulse must attain a threshold value before it will effect a shift in the capacitive value of the cell as measured by the capacity detecting means. While these threshold values may exhibit some variation for different liquid systems, it is believed that such variations will be minor. Furthermore, the threshold values appear to be unaffected by variations in the concentration of electron acceptor in the electrolytic solution. Suitable threshold voltages are in the range of 1.3 to 2 volts, for example, 1.5 volts. Threshold pulse durations are in the range of 15 to 50 seconds.

While it might appear that the threshold amplitude and duration of voltage requirement would be a limitation on the applications of the system of this invention to practical devices, in actuality this phenomenon gives the system greater flexibility. For example, the invention may be employed as a signal discriminator and counter by virtue of the fact that the weaker signals will not effect a change in the base capacitance of the cell. It should be realized, however, that the threshold limitations of the cell may be easily eliminated by the use of transducers and other conventional electrical devices which are capable of amplifying signals to values greater than the threshold values of the cell. Thus, depending upon the particular application of the cell, the threshold limitations may be taken advantage of or eliminated, as desired.

In actual operation, the pulse generator 1 is caused to deliver a pulse of desired polarity, amplitude and duration which effects a change in the value of the cell capacitance as measured by the detecting means 13. It is a further feature of this invention that the application of a reverse pulse, i.e., a pulse of opposite polarity, erases the increased capacitance and returns the cell capacitance to its initial value. While the reverse pulses must meet the threshold amplitude requirements to effect the cell capacitance, it has been found that the reverse pulses may be of substantially shorter duration. In the preferred erasing technique, a series of short pulses of 5 to 10 seconds' duration is employed.

The operation of the invention will be further understood by reference to the following illustrative examples:

*Example 1*

A cell similar to that described in FIGURE 2 was prepared by immersing two 1 cm. platinum squares at a spacing of 0.2 cm. in a solution having a concentration of 2.95 gms. iodine/1000 gms. pyridine. The cell was electrically connected in the system described in FIGURE 1.

Figure 3A:
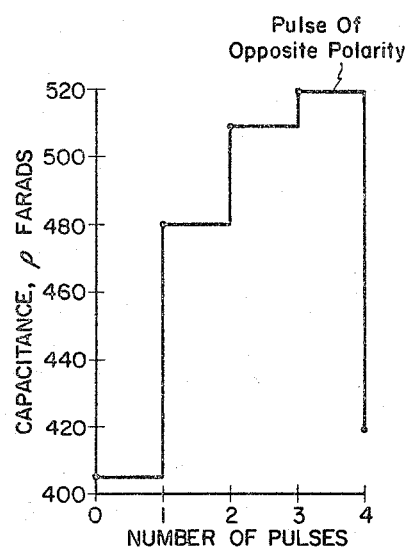
FIGURES 3A and 3B are graphical illustrations of the operation of the invention.

The graph in FIGURE 3A depicts the effect of a series of 1.6 volt amplitude direct current pulses of 1 minute duration on the capacitance at a measuring frequency of $4 \times 10^4$ cycles/sec. The base capacitance as measured before application of any pulse was 405 picofarads. Each additional point on the graph represents the measured capacitance at the end of a pulse. A study of the graph clearly indicates that the first pulse causes a discrete change in the measured capacitance of the cell and each succeeding pulse of equal magnitude causes further increases in capacitance, although the change in capacitance becomes smaller as the saturation capacity of the cell is approached. The graph further indicates that the application of a pulse of opposite polarity causes a decrease in the measured capacitance thereby illustrating the erasing feature of the system.

Several practical applications are readily inferable from the data of the graph. It is apparent that the system may be employed as a binary memeory unit the purpose of which is to distinguish between two different signal conditions. Thus, after first determining the base capacitance value as shown in FIGURE 3 it is possible to "read out" by means of the detector whether or not a pulse has ever been applied to the system. Since the "reading out" procedure does not destroy the stored signal, the first pulse may be retained and subsequent determinations as to the presence or absence of additional signals may be made by determining whether or not the capacitance has varied from its last measured value. Alternatively, subsequent use of the system as a binary unit may proceed after erasing the first pulse so as to return the cell to its base capacitance value.

It should be clear from the above description that the system of this invention is capable of being applied to more complex operations than the binary system described above. Since the application of pulses of opposite polarity will decrease the measured capacitance as shown in FIGURE 3, the cell may also be employed in a trinary system wherein the polarity of the signal as well as its presence may be determined. Furthermore, the basis of the use of the invention as a counter is also implicit in the description of FIGURE 3 since additional pulses of the same polarity produce further increases in capacitance. This latter application would, of course, require suitable calibration of the detector for the determination of quantitative values.

*Example 2*

Experiments similar to Example 1 were performed employing solutions of 9.6 grams of iodine in 1000 grams of pyridine and 8 grams of iodine in 1000 grams of piperidine or pyridine. While the actual capacity values differed from those in FIGURE 3 by 50 to 60% because of differences in external electrical circuit elements, the systems exhibited similar behavior with respect to the effect of direct current voltage pulses on variations in the measured capacitance.

*Example 3*

A cell similar to that described in Example 1 was electrically connected in the system described in FIGURE 1. It should be emphasized that the fact that the capacitance values described in the following experiments differ from those of FIGURE 3A is not significant since no attempt was made to standardize or calibrate the measurements. The purpose of the example is to demonstrate the operating characteristics of the device of this invention and only the relative values of capacity, rather than their actual values, are significant.

Figure 3B:
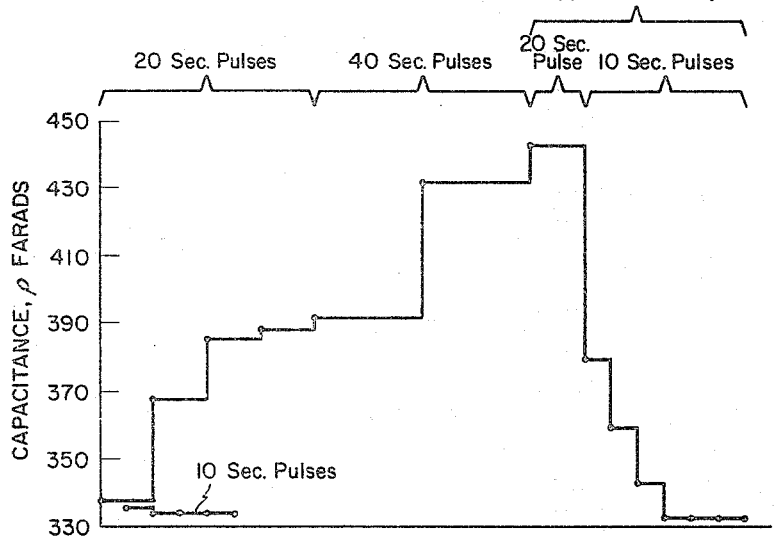

The system of this invention may be employed as a signal discriminator by virtue of properties partly illustrated in FIGURE 3B. The figure illustrates the effect of pulse duration on the magnitude of capacitance alteration for pulses having an amplitude of approximately 1.6 volts. Thus, it can be seen that pulses of 10 seconds have no effect on the magnitude of capacitance. It therefore appears that there is a threshold value of pulse duration for the system employing the cell below which the capacity of the cell will not be effected. FIGURE 3B further indicates that if the pulse duration is above the threshold value there is a relationship between the duration of the pulse and the magnitude of the capacity change. It can readily be seen that the 40 second pulses had a greater effect on the change in capacitance than the 20 second pulses of equal amplitude. An interesting phenomenon is noted in FIGURE 3B with regard to pulses of opposite polarity. The figure clearly illustrates that the duration of these "erasing" pulses need not be as great as the pulses of opposite polarity to effect the magnitude of capacitance. Thus, the application of 10 second pulses of approximately 1.6 volt amplitude were effective in returning the capacity to its base value.

While not illustrated in FIGURE 3B, the system described in this example is also subject to a threshold value of pulse amplitude. The application of pulses below approximately 1.4 volts to the system had no effect on the magnitude of capacity regardless of pulse duration.

It will be apparent to those skilled in electronic instrumentation that the threshold values of the system of this invenion represent discriminatory properties and therefore combinations of the system with conventional apparatus for coupling the pulse generator to external signals may utilize these properties for such operations as counting the number of strong signals in the presence of extensive weak background noise or counting only signals of certain duration out of intermittent short noise signals.

It should be further apparent from the above description of the system of this invention that with suitable calibration both additive and substractive counting of signals under appropriate conditions may be performed and that certain mathematical functions of the signal input may be simulated by the capacitance variation.

Having thus described the general nature and specific embodiments of the invention the true scope will now be pointed out by the appended claims.

What is claimed is:

1. An information storage system comprising a cell having a pair of metal electrodes immersed in a liquid solution consisting of an electron acceptor type solvent selected from the group consisting of halogens, perhaloquinones and percyanoquinones and an electron donor type solvent selected from the group consisting of heterocyclic amines and aromatic hydrocarbons, a source of discrete direct current voltage pulses, means for electrically coupling said source across said electrode thereby to impress a pulse on said cell for varying the capacitance of said cell above the base capacitance of said cell, capacitance detecting means and means for electrically coupling said detecting means across said electrodes thereby to indicate the capacitance of said cell.

2. The system of claim 1 wherein said detecting means is a capacitance bridge.

3. The system of claim 1 wherein said direct current voltage pulses have a duration of at least 15 seconds and an intensity of at least 1.3 volts.

4. The system of claim 1 wherein the electron acceptor type is iodine and the eletcron donor type solvent is pyridine.

5. The system of claim 4 wherein the concentration of said iodine in tht liquid solution is in the range of 0.1 to 10 wt. percent.

6. The system of claim 1 wherein amplifying means are electrically connected to said source of voltage pulses.

7. A memory cell comprising a liquid solution consisting of an electron acceptor type solvent selected from the group consisting of halogens, perhaloquinones and percyanoquinones and an electron donor type solvent selected from the group consisting of heterocyclic amines and aromatic hydrocarbons, said solution having a pair of metal electrodes immersed therein.

8. The cell of claim 7 wherein said electron acceptor is a halogen and said electron donor is a heterocyclic amine.

9. The cell of claim 8 wherein said electron acceptor is iodine and said electron donor is pyridine.

10. The cell of claim 8 wherein said electron acceptor is iodine and said electron donor is piperidine.

11. A capacitive circuit element having a capacitance value which can be reversibly varied, without effecting any change in the physical structure of the element, by the application of electrical pulses which comprises a liquid solution consisting of an electron acceptor type solvent selected from the group consisting of halogens, perhaloquinones, and percyanoquinones and an electron donor type solvent selected from the group consisting of heterocyclic amines and aromatic hydrocarbons, said solution having a pair of metal electrodes immersed therein.

12. The element of claim 11 wherein the electron acceptor is a halogen and the electron donor is a heterocyclic amine.

13. The element of claim 12 wherein the electron accetpor is iodine and the electron donor is pyridine.

14. The element of claim 12 wherein the electron acceptor is iodine and the electron donor is piperidine.

References Cited

UNITED STATES PATENTS 2,455,543  12/1948  Williams _____ 324—60
2,627,504  2/1953   Hardy _____ 317—259

BERNARD KONICK, *Primary Examiner.*

J. BREIMAYER, *Assistant Examiner.*